(No Model.)

H. H. FULTON.
WHEEL OR PULLEY.

No. 297,514. Patented Apr. 22, 1884.

WITNESSES.
Chas. N. Leonard,
E. W. Bradford.

INVENTOR.
Harmon H. Fulton,
PER
C. Bradford.
ATTORNEY.

UNITED STATES PATENT OFFICE.

HARMON H. FULTON, OF INDIANAPOLIS, INDIANA, ASSIGNOR TO THE INDIANAPOLIS MACHINE AND BOLT WORKS, OF INDIANA.

WHEEL OR PULLEY.

SPECIFICATION forming part of Letters Patent No. 297,514, dated April 22, 1884.

Application filed December 18, 1883. (No model.)

*To all whom it may concern:*

Be it known that I, HARMON H. FULTON, of the city of Indianapolis, county of Marion, and State of Indiana, have invented certain new and useful Improvements in Wheels or Pulleys, of which the following is a specification.

My present invention consists in constructing a wheel or pulley composed of a suitable hub and rim, and a web composed of two separate corrugated sheet-metal plates, as will be presently more fully described.

Figure 1:
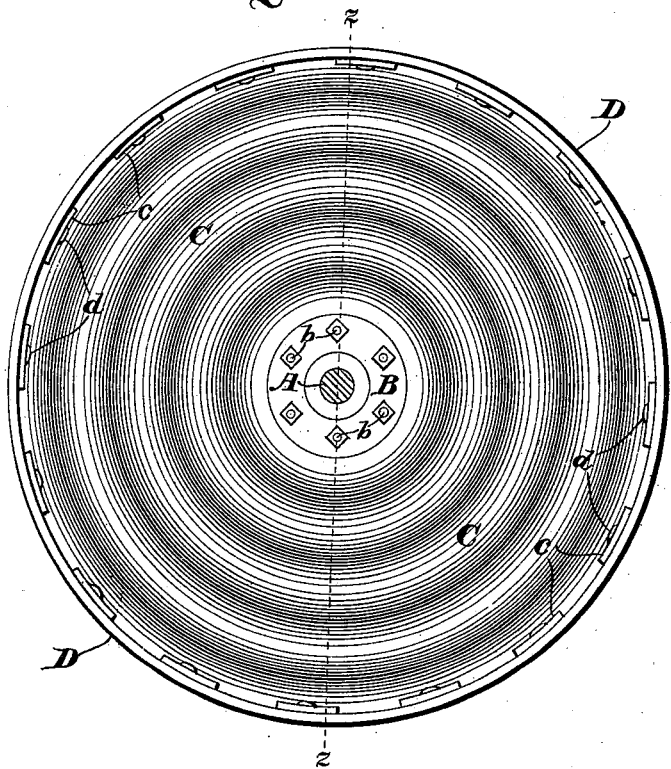
Figure 2:
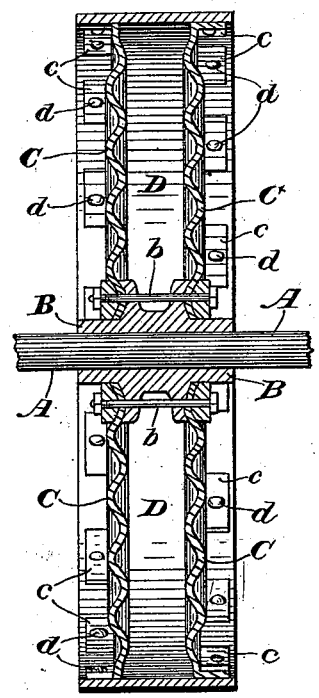

Referring to the accompanying drawings, which are made a part hereof, and on which similar letters of reference indicate similar parts, Figure 1 is a side elevation of a wheel embodying my invention, and Fig. 2 is a central vertical section on the dotted line $z$ $z$.

In said drawings, the portions marked A represent the shaft on which the wheel or pulley is mounted; B, the hub; C C, the disks forming the web, and D the rim.

The shaft A and rim D are not different from like portions of well-known similar devices, and will not therefore be further described.

The hub B consists of three parts, as shown. The main part contains the bore for the shaft, and extends up between the two disks of the web, the outer faces of the portion which extends up between the disks being formed to fit the corrugations in said disks. The two outer parts are flanges or rings which are adapted to slip over the ends of the main portion, and the inner faces thereof are formed to fit against the outer faces of the disks and hold them tightly against the outer faces of that portion of the main part that extends up between them. The several parts of the hub are secured together by bolts $b$ and the disks forming the web, thus securing the hub and web firmly together.

The disks C C are separately similar to the disk forming the web, shown in Letters Patent No. 278,425, dated May 29, 1883, in which a single disk in the center of the pulley forms the web, while in this invention two are employed—one on each side—and thus a much stronger wheel is produced. The ears $c$ are preferably all turned outwardly, as shown, instead of being turned in each direction, and are secured to the rim, as before, by rivets $d$.

My improved wheel or pulley is very desirable where great strength combined with light weight is required, as in case of mowing-machine and traction-engine wheels, large friction-pulleys, &c.

Having thus fully described my said invention, what I claim as new, and desire to secure by Letters Patent, is—

1. A wheel or pulley composed of a hub consisting of three parts, a web consisting of two corrugated sheet-metal disks arranged substantially parallel with each other, and a rim, said several parts being constructed and secured together, substantially as shown and described, and for the purposes specified.

2. The combination of the three-part hub B, the double corrugated sheet-metal web C C, and rim D, forming a wheel or pulley, substantially as shown and specified.

In witness whereof I have hereunto set my hand and seal, at Indianapolis, Indiana, this 14th day of December, A. D. 1883.

HARMON H. FULTON. [L. S.]

In presence of—
 E. W. BRADFORD,
 CHAS. L. THURBER.